(12) United States Patent
Barsness et al.

(10) Patent No.: US 7,464,370 B2
(45) Date of Patent: Dec. 9, 2008

(54) CREATING A METHOD FROM A BLOCK OF CODE

(75) Inventors: Eric Lawrence Barsness, Pine Island, MN (US); Richard Dean Dettinger, Rochester, MN (US); Brian Edward Olson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/728,017

(22) Filed: Dec. 4, 2003

(65) Prior Publication Data

US 2005/0125774 A1  Jun. 9, 2005

(51) Int. Cl.
*G06F 9/44* (2006.01)

(52) U.S. Cl. .................. 717/106; 715/724; 715/770

(58) Field of Classification Search .............. 717/106
See application file for complete search history.

(56) References Cited

U.S. PATENT DOCUMENTS

| | | | | |
|---|---|---|---|---|
| 5,325,533 | A * | 6/1994 | McInerney et al. | 717/107 |
| 5,701,489 | A * | 12/1997 | Bates et al. | 717/157 |
| 5,740,443 | A * | 4/1998 | Carini | 717/133 |
| 5,845,119 | A * | 12/1998 | Kozuka et al. | 717/107 |
| 6,072,951 | A * | 6/2000 | Donovan et al. | 717/158 |
| 6,195,793 | B1 * | 2/2001 | Schmidt | 717/151 |
| 6,230,314 | B1 * | 5/2001 | Sweeney et al. | 717/108 |
| 6,301,700 | B1 * | 10/2001 | Choi et al. | 717/116 |
| 6,427,234 | B1 * | 7/2002 | Chambers et al. | 717/140 |
| 6,578,194 | B1 * | 6/2003 | Baumgart et al. | 717/140 |
| 6,851,106 | B1 * | 2/2005 | Narisawa et al. | 717/108 |
| 6,851,110 | B2 * | 2/2005 | Hundt et al. | 717/159 |
| 6,904,454 | B2 * | 6/2005 | Stickler | 709/213 |
| 6,934,935 | B1 * | 8/2005 | Bennett et al. | 717/127 |
| 7,110,936 | B2 * | 9/2006 | Hiew et al. | 703/22 |
| 7,137,104 | B2 * | 11/2006 | Tip et al. | 717/126 |
| 7,240,338 | B1 * | 7/2007 | Bell et al. | 717/137 |
| 7,266,813 | B2 * | 9/2007 | Nistler et al. | 717/141 |

(Continued)

OTHER PUBLICATIONS

Gallagher, Keith, Loyola College in Maryland; Layman, Lucas, North Carolina State University; "Are Decomposition Slices Clones?", 2003 IEEE, retrieved from scholar.google.com on Aug. 27, 2007.*

(Continued)

*Primary Examiner*—Wei Y. Zhen
*Assistant Examiner*—Phillip H Nguyen
(74) *Attorney, Agent, or Firm*—Owen J. Gamon

(57) ABSTRACT

A method, apparatus, system, and signal-bearing medium that in an embodiment determine whether a block of code associated with a copy-and-paste operation or a punch-out operation has a size greater than a threshold. If the size is greater than the threshold, then a method is created and the block of code is pasted into the method. Also, an invocation to the newly created method is added at the copied-from location and the intended pasted-to location (in the case of the copy-and-paste operation) or an invocation to the newly created method is added at the copied-from location (in the case of the punch-out operation). In this way, future modifications to the block of code need only be made in one place: the method, instead of at all locations where duplicate code exists. Thus, embodiments of the invention may reduce the fragility of the code.

6 Claims, 5 Drawing Sheets

U.S. PATENT DOCUMENTS

| | | | |
|---|---|---|---|
| 2002/0032804 A1* | 3/2002 | Hunt | 709/320 |
| 2002/0184609 A1* | 12/2002 | Sells et al. | 717/106 |
| 2003/0204833 A1* | 10/2003 | Pokhariyal | 717/106 |
| 2004/0111719 A1* | 6/2004 | Civlin | 717/159 |
| 2004/0221282 A1* | 11/2004 | Le Metayer et al. | 717/159 |
| 2005/0097530 A1* | 5/2005 | Asao et al. | 717/140 |
| 2005/0229154 A1* | 10/2005 | Hiew et al. | 717/110 |

OTHER PUBLICATIONS

Myers, Brad A; Kosbie, David S; "Reusable Hierarchical Command Objects", 1996 ACM, p. 260-267, retrieved from scholar.google.com Aug. 27, 2007.*

Myers, Brad; Ko, Andrew; "Studying Development and Debugging To help Create a Better Programming Environment: For the CHI 2003 Workshop on Perspectives in End User Development", 2003, retrieved from scholar.google.com Aug. 27, 2007.*

* cited by examiner

CREATING A METHOD FROM A BLOCK OF CODE

FIELD

This invention generally relates to computer software development and more specifically relates to creating a method from a block of code.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs or code.

One frequent problem in the development and modification of code is the longer the life cycle of the software, the more changes the code requires. As more changes are put into the code, the code becomes more complex and more difficult to understand and therefore more prone to programming errors in the next modifications. Code that is prone to programming errors is often called fragile. Perhaps the most significant cause for code becoming fragile over time is programmers making modifications to the code via a copy-and-paste technique.

For example, the programmer recognizes that pre-existing code at a first path or location is also needed by a second path or location, so the programmer copies the code from the first location and pastes it into the second location. Identical code now exists in two locations. The copy-and-past technique is quick and easy for the programmer at the moment, but it creates a situation that may cause errors later on. For example, if the programmer later discovers that the copied code has an error and fixes the error in the first location, but forgets that the copied code also exists at the second location, then the error is only partially resolved. Thus, the copy-and-paste technique for creating new code results in fragile software that requires a careful programmer with good recall of code changes that have been made in the past.

A good programmer knows that the way to avoid problems caused by the copy-and-paste technique is to create a separate routine that includes the code and call the routine from both the first and the second location. Thus, the code only exists in one place: the separate routine. If the code ever requires modifications in the future, the programmer need only modify the separate routine, and the programmer is not burdened with trying to remember all of the locations where the code exists. Unfortunately, programmers rarely take the time and effort to create a separate routine because it requires additional work at the moment, and programmers are routinely rushed and under pressure to work quickly.

Without a better way to handle code modifications, computer software will continue to suffer from errors and fragility, which results in less reliable computer software, which is more expensive to maintain.

SUMMARY

A method, apparatus, system, and signal-bearing medium are provided that in an embodiment determine whether a block of code associated with a copy-and-paste operation or a punch-out operation has a size greater than a threshold. If the size is greater than the threshold, then a method is created and the block of code is pasted into the method. Also, an invocation to the newly created method is added at the copied-from location and the intended pasted-to location (in the case of the copy-and-paste operation) or an invocation to the newly created method is added at the copied-from location (in the case of the punch-out operation). In this way, future modifications to the block of code need only be made in one place: the method, which may reduce the fragility of the code.

DETAILED DESCRIPTION

Figure 1:
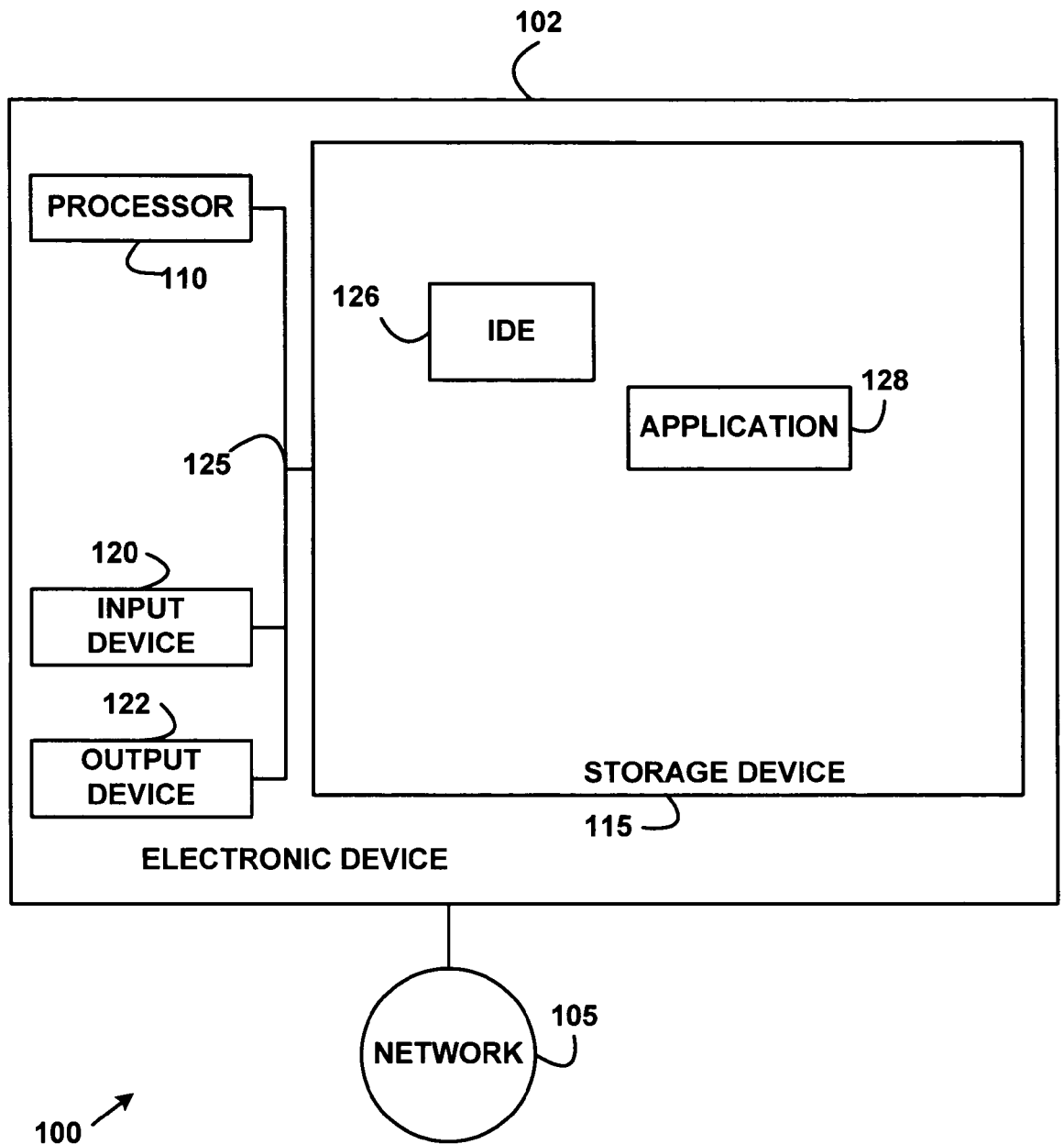
FIG. 1 depicts a high-level block diagram of an example system for implementing an embodiment of the invention.

Referring to the Drawing, wherein like numbers denote like parts throughout the several views, FIG. 1 depicts a high-level block diagram of an example system 100 for implementing an embodiment of the invention. The system 100 includes an electronic device 102 connected to a network 105. Any number of electronic devices and networks may be present, and in another embodiment the network 105 is optional, not present, or not used.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122. Although the electronic device 102 is drawn to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Although the storage device 115 is shown in FIG. 1 as a single monolithic entity, the storage device 115 may in fact be distributed and/or hierarchical, as is known in the art. For example, the storage device 115 may exist in multiple levels of storage devices, and these levels of storage devices may be further divided by function, so that one level of storage device holds, e.g., instructions while another holds, e.g., non-instruction data which is used by the processor or processors. The storage device 115 may further be distributed and associated with different processors or sets of processors, as is known in any of various so-called non-uniform memory access (NUMA) computer architectures. Further, although the electronic device 102 is drawn to contain the storage device 115, it may be distributed across other electronic devices, such as electronic devices connected to the network 105.

The storage device 115 includes an Integrated Development Environment (IDE) and an application 128, both of which may in various embodiments exist in any number. Although the Integrated Development Environment 126 and the application 128 are illustrated as being contained within the storage device II 5,in the electronic device 102, in other embodiments either or both may be on different electronic devices and may be accessed remotely, e.g., via the network 105.

The Integrated Development Environment 126 includes an editor capable of manipulating the code in the application 128. In an embodiment, the Integrated Development Environment 126 includes instructions capable of executing on the processor 110 or statements capable of being interpreted by instructions executing on the processor 110 to present the user interface as further described below with reference to FIG. 2 and to perform the functions as further described below with reference to FIGS. 3, 4, and 5. In another embodiment, the Integrated Development Environment 126 may be implemented in hardware via logic gates and/or other appropriate hardware techniques in lieu of or in addition to a processor-based system.

The application 128 may be any appropriate software code. In various embodiments, the application 128 may be written in a high level, low level, or any other type of computer language, may be compilable, or interpretable, or directly executable on the processor 110. The application 128 is capable of being manipulated by the integrated development environment 126.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102, as further described below with reference to FIG. 2. Although only one input device 120 is shown, in another embodiment any number and type of input devices may be present.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interfaces, such as the user interfaces and output further described below with reference to FIG. 2.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller). Although the bus 125 is shown in FIG. 1 as a relatively simple, single bus structure providing a direct communication path among the processor 110, the storage device 115, the input device 120, and the output device 122, in other embodiments the bus 125 may comprise multiple different buses or communication paths, which may be arranged in any of various forms, such as point-to-point links in hierarchical, star or web configurations, multiple hierarchical buses, or parallel and redundant paths. Furthermore, while the bus 125 is shown directly connected to the processor 110, the storage device 115, the input device 120, and the output device 122, in other embodiments, some or all of the I/O (Input/Output) devices may be connected via I/O processors.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be a FRS (Family Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The various software components illustrated in FIG. 1 and implementing various embodiments of the invention may be implemented in a number of manners, including using various computer software applications, routines, components, programs, code, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device 102 to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
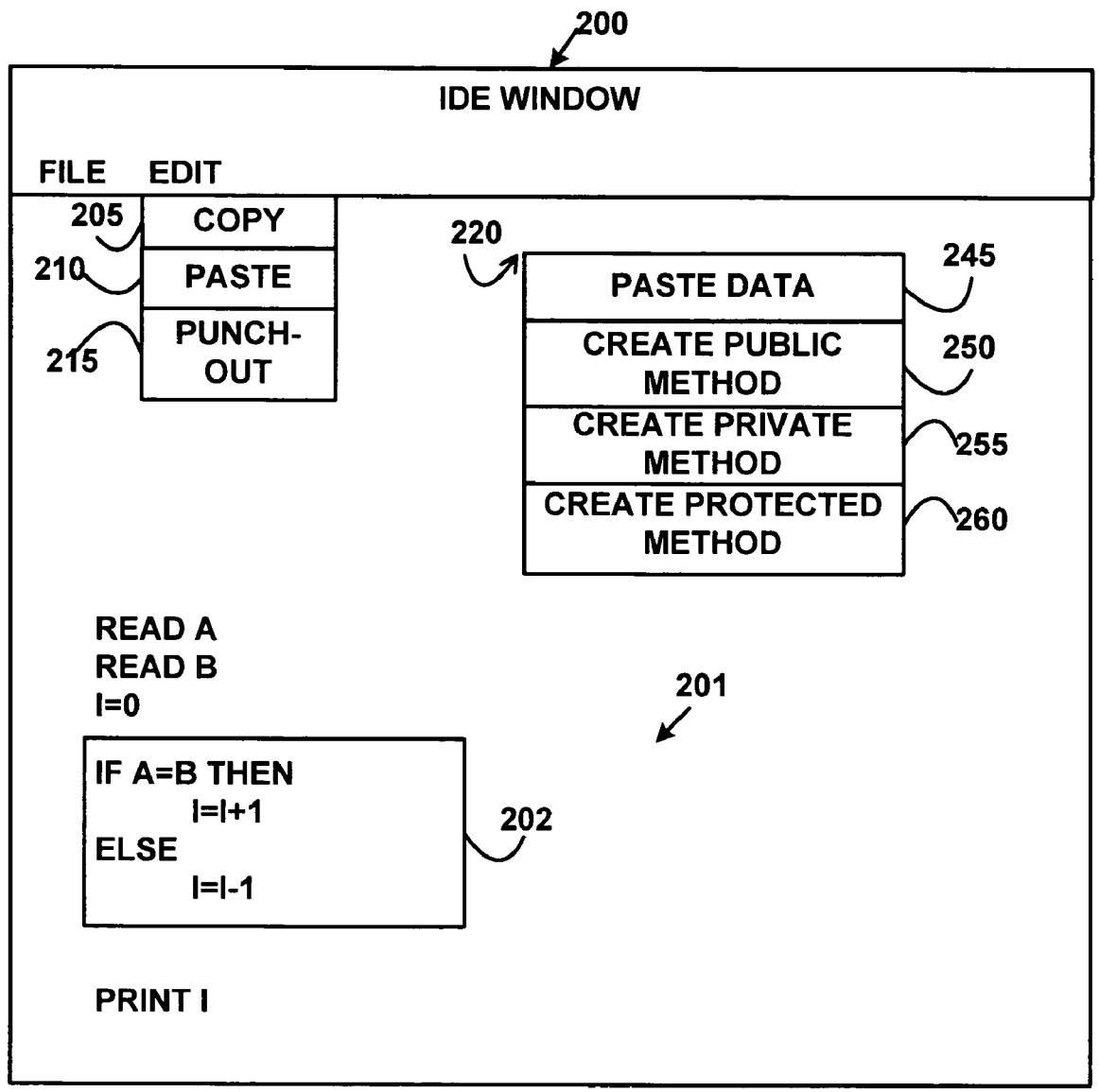
FIG. 2 depicts a pictorial representation of an example user interface, according to an embodiment of the invention.

FIG. 2 depicts a pictorial representation of an example user interface 200, which the integrated development environment 126 presents via the output device 122 (FIG. 1), according to an embodiment of the invention. Displayed within the user interface 200 are example code 201 from the application 128, a copy option 205, a paste option 210, a punch-out option 215, and a dialog 220.

The example code 201 includes a selected block 202 of the code 201, on which the user desires to perform an operation. The copy option 205 allows the user to request that the integrated development environment 126 copy the selected block 202 from the copy location (the location of the selected block 202) to a clipboard or other temporary storage. The paste option 210 and the punch-out option 215 both cause the integrated development environment 126 to display the dialog 220 with various of the options 245, 250, 255, and/or 260 available for selection as further described below with reference to FIGS. 3 and 4.

The paste option 210 allows the user to request that the integrated development environment 126 create a new method (whose type is determined from the dialog 220), paste the selected block 202 from the clipboard or other temporary storage into the new method, replace the selected block 202 at the copy location with an invocation of the new method, and add an invocation of the new method at the paste location in lieu of pasting the code of the selected block 202 to the paste location. Prior to requesting the paste option 210, the user selects a paste location in the application 128 via the input device 120 where the user desires the selected block 202 to be pasted. Processing for the paste option 210 by the integrated development environment 126 is further described below with reference to FIG. 5.

The punch-out option 215 allows the user to request that the integrated development environment 126 create a new method (whose type is determined from the dialog 220), paste the selected block 202 into the new method, and replace the selected block 202 with an invocation of the new method. An example of a scenario where the user may wish to use the punch-out option 215 is if the application 128 includes code that the user desires to break up into multiple methods. Processing for the punch-out option 215 by the integrated development environment 126 is further described below with reference to FIG. 5.

The dialog 220 includes a paste data option 245, a create public method option 250, a create private method option 255, and a create protected method option 260. In various embodiments, the integrated development environment 126 selectively determines which of the options 245, 250, 255, and 260 to present or make available for selection in the dialog 220 as further described below with reference to FIGS. 3 and 4. Further, the integrated development environment 126 selectively determines which of the options 245, 250, 255 and 260 to designate as the default as further described below with reference to FIGS. 3 and 4.

The paste data option 245 allows the user to request that the integrated development environment 126 paste the selected block 202 at a paste location without creating a method that incorporates the selected block 202.

The create public method option 250 allows the user to request that the integrated development environment 126 create a public method that contains the code in the selected block 202. A public method is a kind of method that can be accessed by any code anywhere. A method is a function or a unit of code.

The create private method option 255 allows the user to request that the integrated development environment 126 create a private method that contains the code in the selected block 202. A private method is a kind of method that can only be accessed by code in the same class. A class is a template that describes variables and methods that are common to instances of the class, which are called objects.

The create protected method option 260 allows the user to request that the integrated development environment 126 create a protected method that contains the code in the selected block 202. A protected method is a kind of method that can be accessed by code in the same package as the class associated with the protected method as well as code in any subclasses, even if they are not in the same package as the protected method. A package is a collection of related classes and interfaces.

The format of the user interface 200, the code 201, and the options illustrated in FIG. 2 are exemplary only and in other embodiments any appropriate format, code, and options may be used. For example, in another embodiment, the request for the copy-and-paste operation is not restricted to menu options, but may take the form of a drag-and-drop operation.

Figure 3:
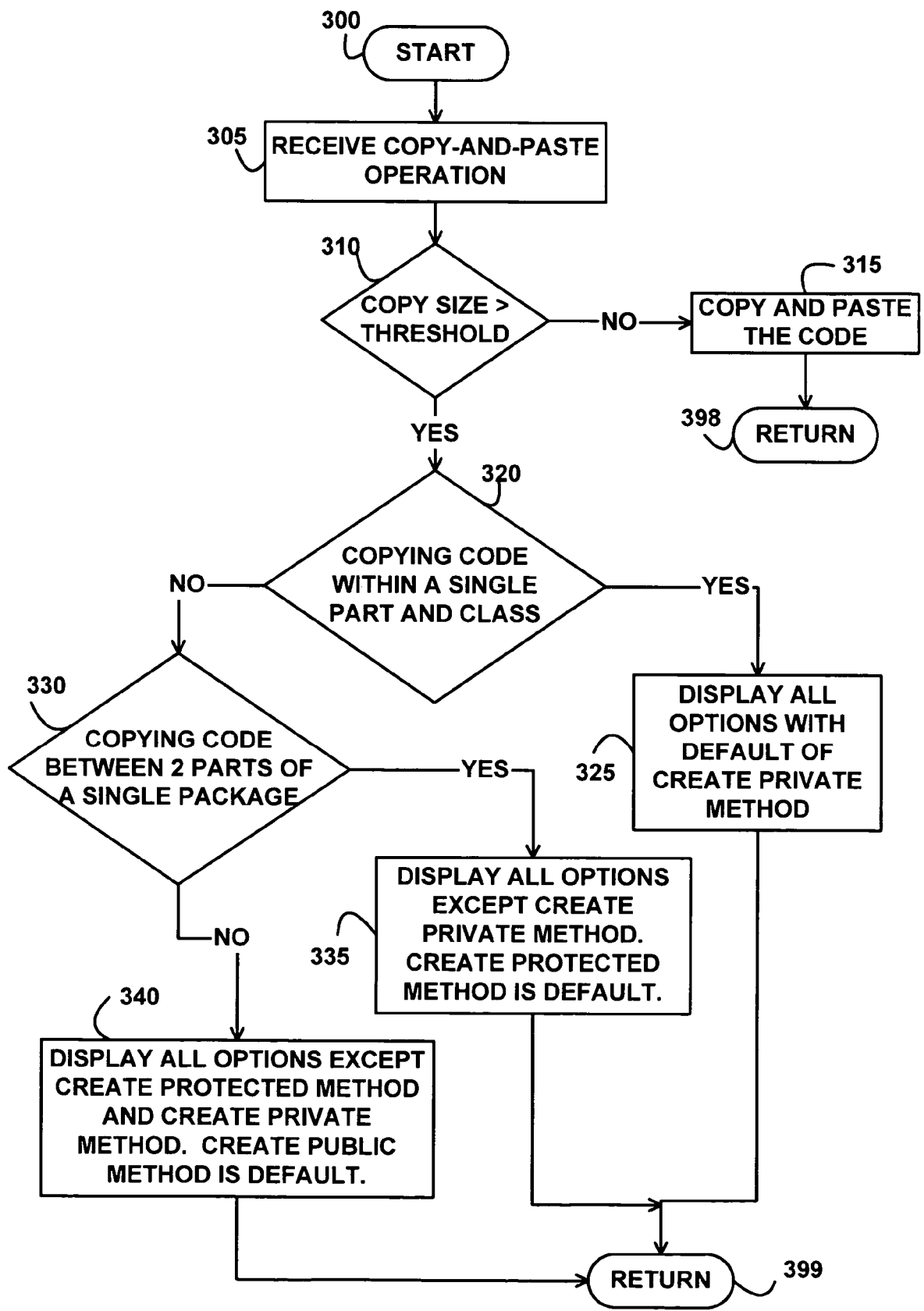
FIG. 3 depicts a flowchart of example processing for presenting a user interface dialog for a copy-and-paste operation, according to an embodiment of the invention.

FIG. 3 depicts a flowchart of example processing for presenting the user interface dialog 220 (FIG. 2) for a copy-and-paste operation, according to an embodiment of the invention. Control begins at block 300. Control then continues to block 305 where the integrated development environment 126 receives a copy-and-paste operation, which in an embodiment the user may initiate by selecting a block of code in the application 128, e.g., the selected block 202, selecting the copy operation 205, selecting a paste location, and selecting the paste operation 215, as previously described above with reference to FIG. 2.

Control then continues to block 310 where the integrated development environment 126 determines whether the size of the selected block 202 is greater than a threshold. In an embodiment, the threshold is ten lines-of code, but in other embodiments, the threshold may be any number and in various embodiments may be user configurable, or may be variable depending on the size of the part, the number of methods already existing in the package, or based on any other criteria.

If the determination at block 310 is true, then the size of the selected block 202 is greater than the threshold, so control continues to block 320 where the integrated development environment 126 determines whether the copy-and-paste operation has requested that the block of code 202 be copied within a single part and class. A part is a unit of code (e.g., a file) within a package.

If the determination at block 320 is true, then the copy-and-paste operation has requested that the block of code 202 be copied within a single part and class, so control continues to block 325 where the integrated development environment 126 displays the dialog 220 with all options 245, 250, 255, and 260 available and the create private method option 255 designated as the default. Control then continues to block 399 where the function returns.

If the determination at block 320 is false, then the copy-and-paste operation has not requested that the block of code 202 be copied within a single part and class, so control continues to block 330 where the integrated development environment 126 determines whether the copy-and-paste operation has requested that the selected block of code 202 be copied between two parts in a single package. If the determination at block 330 is true, then the copy-and-paste operation has requested that the selected block of code 202 be copied between two parts in a single package, so control continues to block 335 where the integrated development environment 126 presents the dialog 220 with the create private method option 255 unavailable and designates the create protected method 260 as the default option. The create private method option 255 is unavailable because the copy-and-paste operation has requested that the selected block 202 be copied between two parts, and a private method is only accessible by code in the same class, which does not span parts. In various embodiments, the integrated development environment 126 makes options unavailable by not presenting them in the dialog 220 or by presenting the unavailable option but changing the font or color (e.g., gray is a typical color for unavailable options) of the unavailable option to indicate that it may not be selected. Control then continues to block 399 where the function returns.

If the determination at block 330 is false, then the copy-and-paste operation has requested that the selected block of code 202 be copied between two parts in two different packages, so control continues to block 340 where the integrated development environment 126 presents the dialog 220 with the create protected method 260 and the create private method option 255 unavailable and designates the create public method 250 as the default option. The create protected method 260 is unavailable because the copy-and-paste operation has requested that the selected block be copied between two parts in two different packages and a protected method is not accessible across packages. The create private method option 255 is not available because a private method is only accessible by code in the same class, which does not span packages. Control then continues to block 399 where the function returns.

If the determination at block 310 is false, then the size of the selected block 202 is less than or equal to the threshold, so control continues to block 315 where the integrated development environment 126 copies the code from the selected block 202 and pastes the code to the location (the paste location) specified by the user. Control then continues to block 398 where the function returns.

Figure 4:
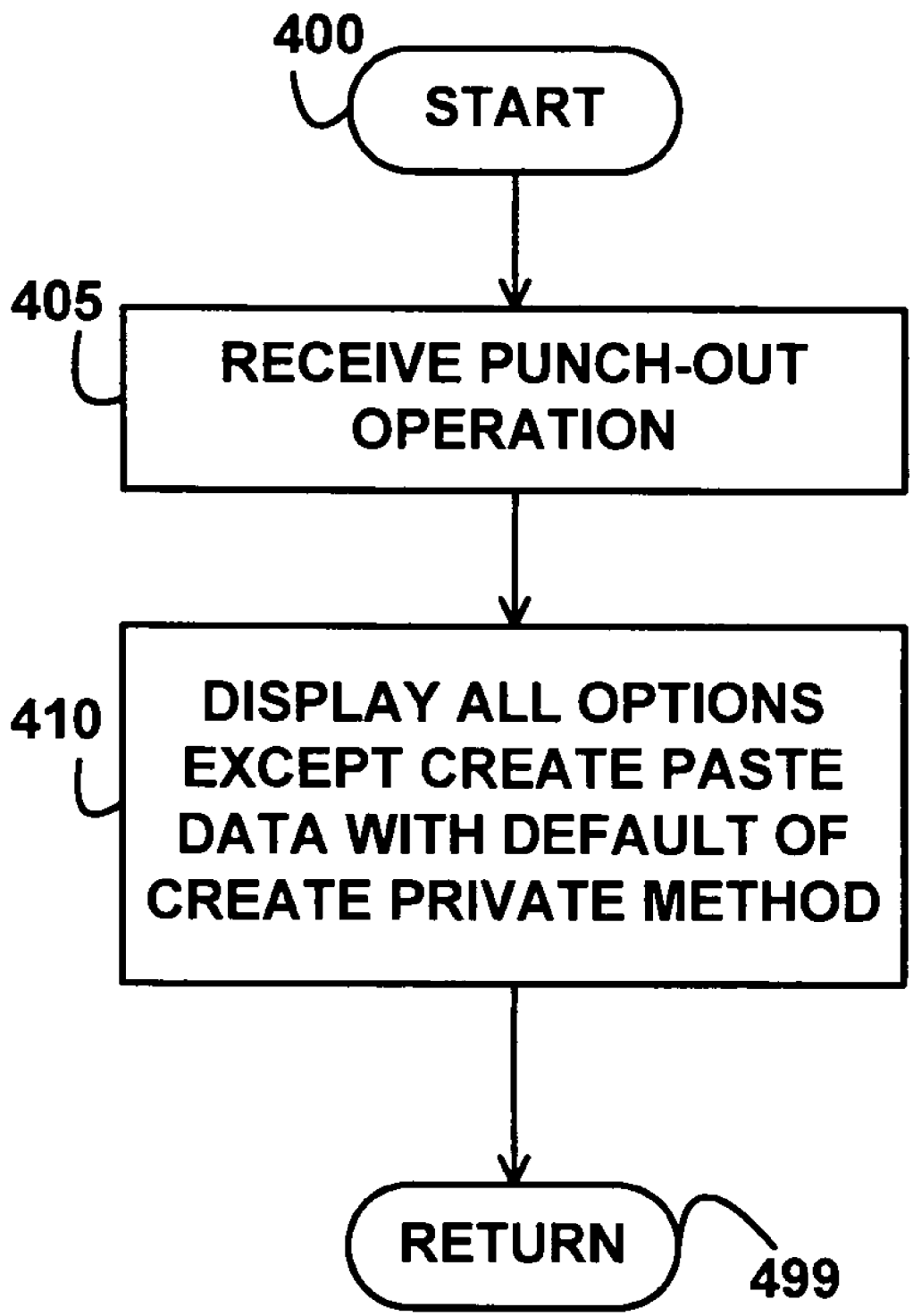
FIG. 4 depicts a flowchart of example processing for presenting a user interface dialog for a punch-out operation, according to an embodiment of the invention.

FIG. 4 depicts a flowchart of example processing for presenting the user interface dialog 220 (FIG. 2) for a punch-out operation, according to an embodiment of the invention. Control begins at block 400. Control then continues to block 405 where the integrated development environment 126 receives a request for a punch-out operation. The request for the punch-out operation is initiated by a user selection of the punch-out option 215 (FIG. 2). Control then continues to block 410 where the integrated development environment 126 displays options 250, 255, and 260 (but not the paste data option 245) in the dialog 220 and designates the create private method option 255 as the default option. Control then continues to block 499 where the logic of FIG. 4 returns.

Figure 5:
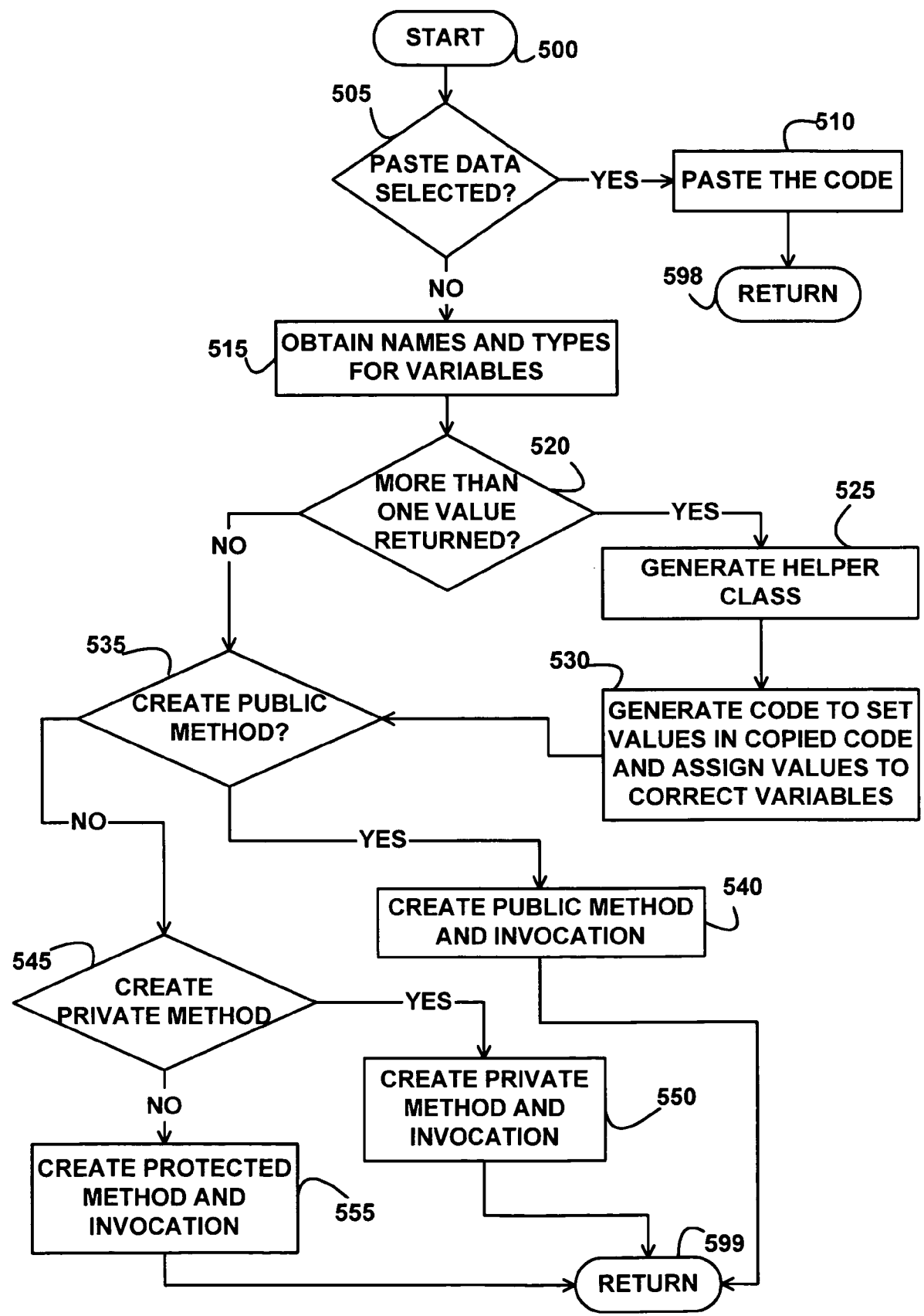
FIG. 5 depicts a flowchart of example processing for copy-and-paste and punch-out operations, according to an embodiment of the invention.

FIG. 5 depicts a flowchart of example processing for the copy-and-paste and punch-out functions in the integrated development environment 126, according to an embodiment of the invention. Control begins at block 500. Control then continues to block 505 where the integrated development environment 126 determines whether the paste data option 245 (FIG. 2) was selected. If the determination at block 505 is true, then the paste data option 245 was selected, so control continues to block 510 where the integrated development environment 126 pastes the code from the selected block 202 to the selected paste location. Control then continue to block 598 where the logic of FIG. 5 returns.

If the determination at bock 505 is false, then the paste data option 245 was not selected, so control continues to block 515 where the integrated development environment 126 obtains names and types for the variables in the selected block of code 202. Control then continues to block 520 where the integrated development environment 126 determines whether the selected block of code 202 returns more than one value. If the determination at block 520 is true, then the selected block 202 returns more than one value, so control continues to block 525 where the integrated development environment 126 generates a helper class to return the multiple values since in an embodiment a method may only return one value.

Control then continues to block 530 where the integrated development environment 126 generates code in a method associated with the helper class to set values in the copied code block 202 and assign values to the correct variables.

Control then continues to block 535 where the integrated development environment 126 determines whether the create public method option 250 was selected. If the determination at block 535 is true, then the create public method option 250 was selected, so control continues to block 540 where the integrated development environment 126 creates the public method and copies the selected code block 202 to the public method. The integrated development environment 126 further replaces the selected block 202 with an invocation of the public method.

If the paste option 210 was selected, then the integrated development environment 126 further creates an invocation of the public method at the paste location. The punch-out option 215 does not have a paste location, so if the punchoption 215 was selected, there is no invocation to create. Control then continues to block 599 where the logic of FIG. 5 returns.

If the determination at block 535 is false, then the create public method option 250 was not selected, so control continues to block 545 where the integrated development environment 126 determines whether the create private method option 255 was selected. If the determination at block 545 is true, then the create private method option 255 was selected, so control continues to block 550 where the integrated development environment 126 creates the private method and copies the code in the selected block 202 to the private method. The integrated development environment 126 further replaces the selected block 202 with an invocation of the private method.

If the paste option 210 was selected, the integrated development environment 126 further creates an invocation of the private method at the paste location. The punch-out option 215 does not have a paste location, so if the punch-out option 215 was selected, there is no invocation to create. Control then continues to block 599 where the logic of FIG. 5 returns.

If the determination at block 545 is false, then the create protected method 260 was selected, so control continues to block 555 where the integrated development environment 126 creates a protected method and copies the code in the selected block 202 to the protected method. The integrated development environment 126 further replaces the selected block 202 with an invocation of the protected method.

If the paste option 210 was selected, the integrated development environment 126 further creates an invocation of the protected method at the paste location. The punch-out option 215 does not have a paste location, so if the punch-out option 215 was selected, there is no invocation to create. Control then continues to block 599 where the logic of FIG. 5 returns.

If the determination at block 520 is false, then the code in the selected block 202 returns only one value, and a helper class is not necessary, so control continues from block 520 to block 535, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   receiving an operation from a user interface, a selection of a block of code at a copy location in an application, and a selection of a paste location in the application, wherein the copy location is different than the paste location;
   in response to the receiving, determining whether the block of code has a size greater than a threshold;
   if the block of code has the size greater than the threshold, creating a method that comprises the block of code, replacing the block of code at the copy location in the application with a first invocation of the method, adding a second invocation of the method at the paste location, determining that the block of code is to return a plurality of values, and creating a helper class for the method, wherein the helper class returns the plurality of values, wherein the generating the helper class further comprises obtaining names and types for variables in the block of code and generating helper code that sets the variables;
   if the operation requested that the block of code be copied within a single part, designating a created private method option as a default in the user interface;
   if the operation requested that the block of code be copied between two parts in a single package, designating a created protected method option as the default in the user interface and making the created private method option unavailable in the user interface;
   if the operation requested that the block of code be copied between different packages, designating a created public method option as the default in the user interface and making the created private method option and the created protected method option unavailable in the user interface; and
   if the block of code does not have the size greater than the threshold, performing the operation.

2. The method of claim 1, wherein the operation comprises a copy-and-paste operation.

3. The method of claim 1, wherein the operation comprises a punch-out operation.

4. An apparatus comprising a processor, wherein the apparatus further comprises:
   means for receiving a copy-and-paste operation from a user interface, a selection of a block of code at a copy location in an application, and a selection of a paste location in the application, wherein the copy location is different than the paste location;
   means for determining whether the block of code has a size greater than a threshold in response to the means for receiving;
   means for creating a method that comprises the block of code, replacing the block of code at the copy location in the application with a first invocation of the method, adding a second invocation of the method at the paste location, determining that the block of code is to return a plurality of values, and creating a helper class for the method, wherein the helper class returns the plurality of values, wherein the generating the helper class further comprises obtaining names and types for variables in the block of code and generating helper code that sets the variables, if the block of code has the size greater than the threshold;
   means for designating a created private method option as a default in the user interface if the copy-and-paste operation requested that the block of code be copied within a single part;
   means for designating a created protected method option as the default in the user interface and making the created private method option unavailable in the user interface if the copy-and-paste operation requested that the block of code be copied between two parts in a single package;
   means for designating a created public method option as the default in the user interface and making the created private method option and the created protected method option unavailable in the user interface if the copy-and-paste operation requested that the block of code be copied between different packages; and means for performing the copy-and-paste operation, if the block of code does not have a size greater than the threshold.

5. A storage medium encoded with instructions, wherein the instructions when executed comprise:

receiving a copy-and-paste operation from a user interface, a selection of a block of code at a copy location in an application, and a selection of a paste location in the application, wherein the copy location is different than the paste location;

in response to the receiving, determining whether the block of code has a size greater than a threshold;

if the block of code has the size greater than the threshold, creating a method that comprises the block of code, replacing the block of code at the copy location in the application with a first invocation of the method, adding a second invocation of the method at the paste location, determining that the block of code is to return a plurality of values and creating a helper class for the method, wherein the helper class returns the plurality of values, wherein the generating the helper class further comprises obtaining names and types for variables in the block of code and generating helper code that sets the variables;

if the copy-and-paste operation requested that the block of code be copied within a single part, designating a created private method option as a default in the user interface;

if the copy-and-paste operation requested that the block of code be copied between two parts in a single package, designating a created protected method option as the default in the user interface and making the created private method option unavailable in the user interface;

if the copy-and-paste operation requested that the block of code be copied between different packages, designating a created public method option as the default in the user interface and making the created private method option and the created protected method option unavailable in the user interface; and if the block of code does not have the size greater than the threshold, performing the copy-and-paste operation.

6. An electronic device comprising:

a processor; and a storage device encoded with instructions, wherein the instructions when executed on the processor comprise:

receiving a copy-and-paste operation from a user interface, a selection of a block of code at a copy location in the application, and a selection of a paste location in the application, wherein the copy location is different than the paste location;

in response to the receiving, determining whether the block of code has a size greater than a threshold;

if the block of code has the size greater than the threshold, creating a method that comprises the block of code, replacing the block of code at the copy location with a first invocation of the method, adding a second invocation of the method at the paste location, determining that the block of code is to return a plurality of values, and creating a helper class for the method, wherein the helper class returns the plurality of values, wherein the generating the helper class further comprises obtaining names and types for variables in the block of code and generating helper code that sets the variables;

if the copy-and-paste operation requested that the block of code be copied within a single part, designating a created private method option as a default in the user interface;

if the copy-and-paste operation requested that the block of code be copied between two parts in a single package, designating a created protected method option as the default in the user interface and making the created private method option unavailable in the user interface;

if the copy-and-paste operation requested that the block of code be copied between different packages, designating a created public method option as the default in the user interface and making the created private method option and the created protected method option unavailable in the user interface; and if the block of code does not have the size greater than the threshold, performing the copy-and-paste operation.

* * * * *